United States Patent [19]

Songer

[11] Patent Number: 4,589,012
[45] Date of Patent: May 13, 1986

[54] HIGH RESOLUTION TELEVISION

[75] Inventor: Jimmie D. Songer, Burleson, Tex.

[73] Assignee: High Resolution Televison, Inc., Los Angeles, Calif.

[21] Appl. No.: 515,220

[22] Filed: Jul. 19, 1983

Related U.S. Application Data

[63] Continuation-in-part of Ser. No. 364,884, Apr. 2, 1982, abandoned.

[51] Int. Cl.$^4$ ................................................ H04N 7/00
[52] U.S. Cl. ......................................... 358/12; 358/41
[58] Field of Search ....................... 358/11, 12, 41, 50, 358/19, 17, 21 R

[56] References Cited

U.S. PATENT DOCUMENTS

| | | | |
|---|---|---|---|
| 2,989,587 | 6/1961 | Bedford | 178/7.2 |
| 3,536,826 | 10/1970 | McMann, Jr. | 178/5.4 |
| 4,429,327 | 6/1984 | Oakley et al. | 358/12 |

FOREIGN PATENT DOCUMENTS

| | | |
|---|---|---|
| 1016747 | 10/1957 | Fed. Rep. of Germany . |
| 503555 | 4/1939 | United Kingdom . |
| 1400771 | 7/1975 | United Kingdom . |

OTHER PUBLICATIONS

Wendland, B., "Verbessertes Bildfernsprech-System," pp. 1017-1020, Funkschau 1974, Issue 26, Munchen.
Wendland, B., "High Definition Television Studies on Compatible Basis with Present Standards", Television Technology in the 80's, pp. 151-165.
Wendland, W., "Development Options for Future Television Systems", May 7, 1981, Meeting of the SMPTE HDTV Study Group, pp. 1-17.
Tonge, G. J., "The Sampling of Television Images," Experimental and Development Report 112/81, Independent Broadcasting Authority, England, pp. 1-34.

Primary Examiner—Michael A. Masinick
Attorney, Agent, or Firm—Freilich, Hornbaker, Rosen & Fernandez

[57] ABSTRACT

A method and apparatus are disclosed for increasing vertical resolution of television and eliminating vertical aliasing by modulating vertical deflection of the camera a significant number of cycles per line, and modulating the vertical deflection of the display unit in phase with the modulation of the camera while displaying the video signal transmitted. The display unit is provided with its own modulating oscillator operating at the same stable frequency as the modulating frequency of the camera, and phase synchronized by information transmitted by the camera. In the case of NTSC color television, the vertical deflection modulating oscillator of the camera is the color modulating oscillator, and the vertical deflection modulating oscillator of the receiver is the oscillator used for color demodulation phase synchronized by color bursts gated during blanking periods of each frame. A frequency doubler is employed for modulation of vertical deflection in both the camera and the receiver in order that, for a line scanning rate of 15,734 lines per second, there will be 455 modulation cycles for each line. This technique for increasing vertical resolution can be practiced with other equipment and other standards, such as PAL and SECAM, and other video displays including but not limited to computer terminals, teleconferencing, and phonevision.

8 Claims, 4 Drawing Figures

HIGH RESOLUTION TELEVISION

BACKGROUND OF THE INVENTION

This application is a continuation in part of application Ser. No. 06/364,884 filed Apr. 2, 1982, titled HIGH RESOLUTION TELEVISION, now abandoned.

This invention relates to television, and more particularly to a method and apparatus for improving the quality of television reproduction primarily by increasing vertical resolution and eliminating vertical aliasing in broadcast and recorded television programs.

In a television picture, there are two independent resolution factors, namely horizontal resolution, which depends largely upon system bandwidth, and vertical resolution, which depends largely upon the number of active scanning lines in a frame. Various techniques have been employed to increase horizontal resolution. For example, although the video bandwidth is limited to about 4 MHz, the video signal may be processed by a studio with twice the bandwidth of the transmitter on the theory that the better the picture into the transmitter, the better the picture at the receiver. But vertical resolution has, in the past, remained limited by the number of active scanning lines.

In the United States, the National Television Systems Committee (NTSC) has prescribed as a standard the total number of scanning lines of 525 divided into two interlaced fields. This number is significantly reduced to about 485 active scanning lines by the necessary vertical blanking time (approximately 7.5 percent of the total time for scanning 525 lines). Other factors may further degrade horizontal resolution, such as scanning spot size. It would be possible to increase vertical resolution by doubling the number of active scanning lines and decreasing the spot size, but the problem is to increase vertical resolution without deviating from the NTSC standard of 525 lines. The problem exists as to other standards adopted in other parts of the world, such as PAL and SECAM, since any finite number of prescribed lines less than 1000 limits the vertical resolution to substantially less than the horizontal resolution. It would be desirable to improve vertical resolution without increasing the number of horizontal scan lines.

SUMMARY OF THE INVENTION

In accordance with the present invention, vertical resolution is increased for standard television by modulating the vertical scan axis (deflection) of a television camera such that each active scanning line traverses an undulatory path rather than a straight line, i.e., oscillates about the normal scan line. The amplitude of the modulation is preferably sufficient for interlaced lines of a frame to intrude the area of adjacent lines, which is modulation with an amplitude equal to plus and minus one half line spacing of the interlaced fields above and below the center of the spot on the normal scan line. The video signal thus produced by actually scanning areas above and below the normal scan lines is then transmitted just as for the normal scanning lines, which can be within the vestigial bandwidth limit of about 4 MHz for NTSC broadcast transmission, but preferably would be within a wider bandwidth of about 8 MHz or more.

At a monitor or television receiver, a local oscillator modulates the vertical scan axis of each line to be at the same frequency, phase and relative amplitude as the modulation employed in the television camera in order to synchronously reproduce each line of a frame. The local oscillator may be synchronized with the television camera by information contained in the received video signal. For example, in NTSC color transmission, a gated burst of the chrominance subcarrier is transmitted during horizontal blanking periods for use in regenerating the chrominance subcarrier reference in the monitor or television receiver, hereinafter referred to generally as the display unit. Consequently, a convenient modulation frequency is the fundamental or preferably some even harmonic of the chrominance subcarrier frequency (3.579545 MHz, adopted under the NTSC system as the odd multiple of half the line frequency for proper "interleaving" of the color encoded information). In any case, if the modulation in the television camera and the display unit are synchronized, the display unit will reproduce the frame in the same manner as it was scanned in the camera, which is with increased vertical resolution.

The second harmonic (7.15909 MHz), or other even harmonic, such as some multiple of the second harmonic of the chrominance subcarrier frequency is preferred over the fundamental (3.579545 MHz) because, at the standard 15,734.2657342 Hz line frequency, each line will then have substantially a whole number of modulation cycles, such as 455 for the second harmonic, rather than a fractional number of modulations, such as 227.5 for the fundamental, thus making it easier to maintain the same modulation phase from line to line. However, the fundamental chrominance subcarrier frequency or some odd harmonic may be used if the modulation phase is inverted for every other line as needed to bring the modulation in phase for all lines.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
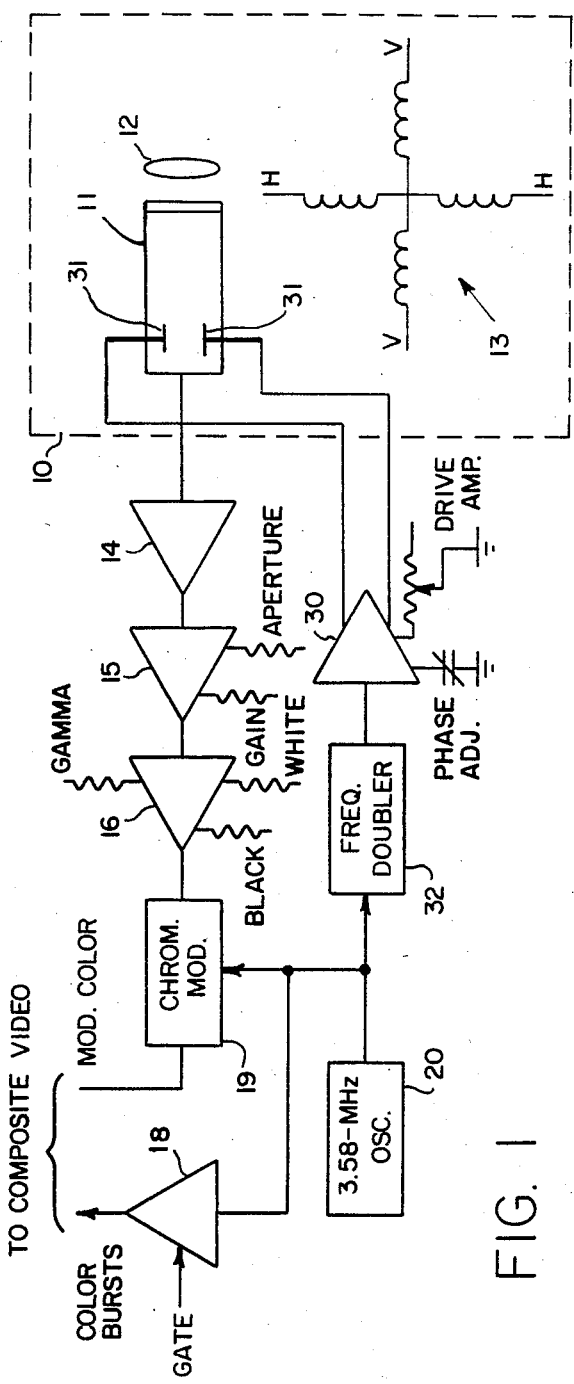
FIG. 1 illustrates schematically that part of a color television camera embodying the present invention.

Referring to the drawings, FIG. 1 illustrates schematically those portions of a color television camera necessary for an understanding of the present invention which include a camera head 10 having a pickup tube 11, lens 12, and deflection yoke 13 for vertical and horizontal deflection of the electron scanning beam. The camera head is controlled by a unit (not shown) which provides the horizontal (H) and vertical (V) drive as well as blanking pulses in the usual manner. The video signal from the pickup tube is processed through a preamplifier 14, a video amplifier 15 (where the aperture and gain are set) and a processing amplifier 16 (where the black level, white level and Gamma are set).

The camera head 10 is shown with only one tube 11, as for black-and-white television, whereas in the NTSC system for color television, three and sometimes four pickup tubes are used to scan the scene received through separate lenses and color filters that separate the red (R), blue (B), and green (G) light. Luminance is derived from the RGB signals as a separate signal (Y) proportional to the sum of the three pickup tube outputs. Here all three pickup tubes are represented by one. A fourth pickup tube is sometimes used for the luminance (Y) signal.

The video signal is modulated (encoded) by a chrominance modulator 19 using a chrominance subcarrier generated by a stable oscillator 20 tuned to precisely 3,579,545 Hz. The modulated color signal is linked to the television transmitter and/or monitor through a control unit where the audio signal is combined. Although the chrominance subcarrier per se is not transmitted, gated chrominance subcarrier bursts are transmitted during horizontal blanking periods for use in synchronizing the frequency and phase of a color reference oscillator in the receiver.

Figure 2:
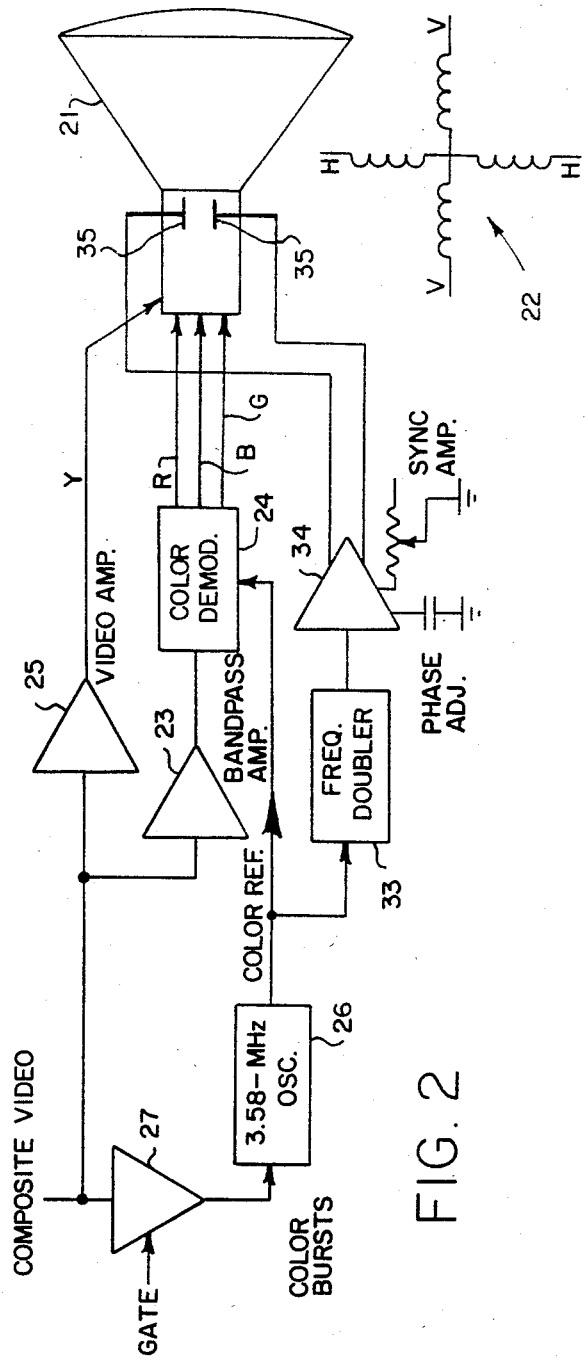
FIG. 2 illustrates schematically that part of a color television receiver embodying the present invention.

FIG. 2 illustrates schematically only those portions of a display unit (color television receiver or monitor) which are necessary for an understanding of the invention. Basically, the display unit is comprised of a picture tube (CRT) 21 and deflection yoke 22. The deflection yoke receives the normal horizontal (H) and vertical (V) sync signals to scan 525 lines in two interlaced fields of 262.5 lines. The CRT also receives the normal line and frame blanking pulses during beam retrace periods. The composite color video is passed through a color bandpass amplifier 23 and demodulator 24 for demodulating the encoded color signals (R, B and G). The luminance signal (Y) is passed by a video amplifier 25 to the picture tube for control of brightness.

For the color demodulation in the display unit, a color reference oscillator 26 tuned to precisely 3,579,545 Hz is synchronized by the gated chrominance subcarrier bursts received via a gated amplifier 27 during each horizontal sync pulse, i.e., during each line blanking period. In that way, color demodulation (decoding) is synchronized with the color modulation (encoding) at the transmitter.

What has been described so far is a color television system comprised of a standard NTSC camera and display unit. Only so much of each has been shown as is necessary to understand and practice the invention. In that regard, it should be understood that the NTSC standard is used by way of example, and not limitation. The invention to be described may be adapted to PAL and SECAM standard systems as well as other standard systems. It can also be adapted to black-and-white single channel systems.

Figure 3:
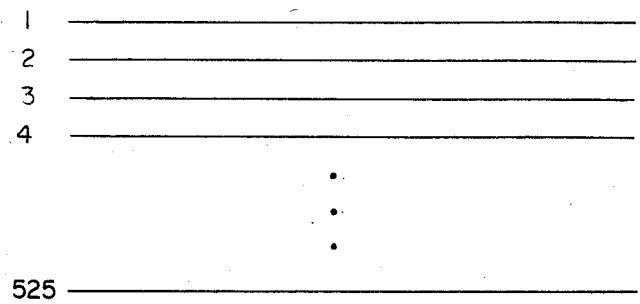
FIG. 3 illustrates schematically the straight parallel scan lines of conventional television scanning and display.
Figure 4:
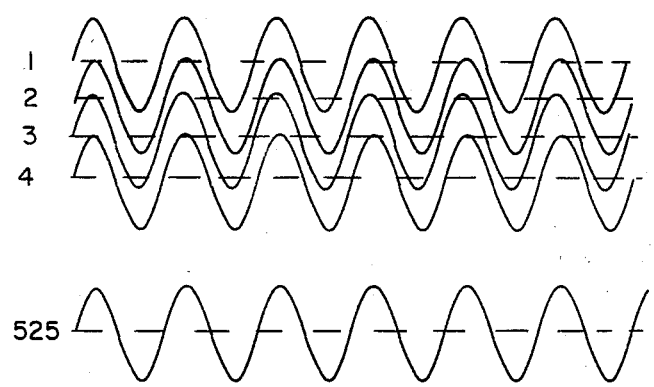
FIG. 4 illustrates schematically the undulating parallel scan lines of the present invention which increases vertical resolution.

The essence of the invention is to use the output of a stable oscillator, such as the chrominance subcarrier oscillator 20, at the camera to modulate the vertical axis (deflection) of its 525 scan lines through a driver 30 and electrostatic deflection plates 31 in the tube 11, or equivalent auxiliary deflection coils located between the yoke 13 and tube 11. The normal (unmodulated) scan follows a pattern shown in FIG. 3. In actuality, the lines are sloped downwardly from left to right as the vertical sync continues to move the beam from the top to the bottom for one field of 262.5 lines. The return (while the line is blanked) is at a much greater rate than the scan, so that what is shown in FIG. 3 more nearly represents the return path for the blanked beam, but for purposes of this invention, it may be assumed that the scan lines are exactly horizontal (as indeed they appear to the viewer). The modulation superimposed on adjacent lines from two fields of a frame is then shown in FIG. 4. Because the modulated scan lines are not straight lines, each modulated line includes more information (pixels). In other words, 525 lines cover more area in the entire scene to increase the vertical resolution by about two or more times, depending upon the amplitude of modulation, the beam spot size and bandwidth of the video signal transmitted to the display unit.

Another significant benefit of this modulation technique is that the scan, no longer a straight line, cannot be parallel to lines in the scene being televised, such as stripes in fabric. As a consequence, vertical aliasing is virtually eliminated over most of the scene. The amount of vertical aliasing eliminated depends upon the relationship of the depth of modulation of the tube at the scan line modulation rate. If maximum, there will be maximum elimination of vertical aliasing.

The literature speaks of the scan rate as 15,750 lines/sec for convenience, just as it does of the chrominance subcarrier as 3.58 MHz, but in actuality the number of lines scanned per second are 15,734.2657342. Dividing that number of lines into 3,579,545 Hz yields 227.5000 cycles of modulation per scan line so the modulation pattern would repeat itself out of phase on every successive line of a field. It is desirable to have the same scanning pattern repeat itself in phase for every line of both fields of a frame. This could be achieved by inverting the modulating 3.58 MHz signal during every other line using the blanking signals to control logic for this phase inversion, but the mathematics of the NTSC standard is fortuitous in that, by doubling the modulating frequency in a frequency doubler 32, there will be 455.0000 cycles of modulation in every line scanned by the camera, and the higher frequency of modulation will increase the number of pixels included in each line scan, thereby increasing vertical resolution even more while also increasing horizontal resolution. Whether a scan line starts with a modulation of phase zero is not important; what is important is only that the same modulation phase be maintained from line to line. Notwithstanding that, a phase adjustment as well as an amplitude adjustment for half line spacing modulation can be made at the driver 30, if desired.

In the display unit, the output of the synchronized 3.58 MHz oscillator 26 is also doubled by a frequency doubler 33 and then applied through a driver 34 to electrostatic deflection plates 35 in order to synchronously modulate the electron beam of the picture tube 21 as it is scanned 525 lines per frame by the yoke 22. The deflection plates 35, or equivalent auxiliary deflection coils, are aligned with the vertical deflection of the yoke 22. In that manner, the same line scan modulation pattern of the camera is synchronously repeated at the picture tube for the desired increase in vertical resolution. Synchronization is achieved through control of the phase of the color oscillator 26 at the display unit by the gated color burst. Since phase control of that oscillator is necessary for color demodulation, no penalty is incurred at the display unit. All that is necessary is a frequency doubler, electrostatic deflection plates (or auxiliary deflection coils), and a driver between the plates (or coils) and the frequency doubler. Note that the camera also requires only a frequency doubler, driver and plates (or coils). Everything else about the camera and display unit is the same as for a standard NTSC system.

If a color display unit is not equipped with a frequency doubler, driver and auxiliary deflection means (plates or coils), the program transmitted from a camera so equipped will be displayed with linear horizontal scan lines. In that sense, the invention is compatible with display units not adapted to display a program with increased vertical resolution.

Although it would be preferable to modulate all three color camera tubes synchronously, it is recognized that the luminance contributions L of the CIE (International Commission on Illumination) red and blue primaries are very low ($L_R=0.004$ and $L_B=0.01$), as compared to the green primary ($L_G=0.98$). Consequently, even though the luminance of the red and blue are increased in the Federal Communications Commission (FCC) primary specification to a value that is practical for available color phosphor, it is R, G and B signals which produce 1.00Y luminance unit (reference white) in the proportion 0.30R, 0.59G and 0.11B. Because of this dominance of the signal G in the luminance signal Y produced by a color encoder from a color television camera, it would be possible to practice the present invention by modulation of only the green tube. The human eye would not notice that the red and blue camera tubes were not synchronously modulated when the color video is displayed by modulation of the television receiver in a corresponding way.

This invention can be used for increased vertical resolution of a black-and-white display unit if it is equipped with a color oscillator, frequency doubler, driver and auxiliary vertical deflection means (plates or coils). If not so equipped, the program transmitted from a camera with modulation of the vertical axis will be displayed with linear horizontal scan lines as if transmitted from a camera not modulated. In that sense the invention is compatible with black-and-white display units. A black-and-white camera can also be modified for increase of vertical resolution by simply providing a local oscillator for modulation, and gating a burst of that signal during blanking pulse periods for phase synchronizing an oscillator in the display unit.

As noted hereinbefore, the general technique of modulating line scan of a camera (color or black-and-white) and synchronously modulating line scan of a display unit can be practiced with other equipment and other standards, such as PAL and SECAM. The manner of synchronizing the modulation at the display unit with the camera modulation can also be varied to use any technique for transmitting from the camera a signal that may be used by the display unit for controlling the phase and frequency of a local oscillator in the display unit. In practice, the horizontal sync pulses themselves could be used to set the phase of the modulating signal from a stable oscillator at the start of each line scan in the camera. The transmitted horizontal sync signal is then detected by the display unit to similarly set the phase of the local oscillator at the start of each line scan.

This general technique increases vertical resolution by increasing video information in the vertical direction, but since each scan line will now include more picture elements (pixels), it will increase horizontal resolution as well. Thus, for a standard display unit not equipped to vertically modulate the horizontal scans, horizontal resolution is improved.

Vertical modulation of the horizontal scan at the camera will not only increase the video information, but also increase the bandwidth of the video signal. This is a direct result of the greater velocity of the electron beam on the target surface. Consequently, to achieve the full potential for increased resolution in both the vertical axis and the horizontal axis, it is necessary to increase the bandwidth of the transmission channel to the display unit. As a general rule, a bandwidth of 12 MHz will yield a resolution in excess of 800 lines of resolution, and a bandwidth of 14 MHz will yield a resolution in excess of 1000 lines of resolution. As a rule, each increase of 2 MHz in bandwidth will increase resolution in excess of 100 lines of resolution. However, since 1000 lines of resolution approaches the quality of 35 mm film, it is believed that a bandwidth of about 12 MHz would be sufficient to achieve the highest resolution desired, particularly for converting film to tape, or tape to film.

This need for a greater bandwidth in order to reach the full potential of the invention presents a problem where, as in the United States, a broadcast television channel is limited to 6 MHz. In practice, only one complete sideband of a 4.5 MHz video carrier is transmitted together with only a vestige (small part equal to 1.25 MHz) of the other sideband. The audio carrier is located at the upper end of the sideband, which is 4.5 MHz higher in frequency than the video carrier, and 0.25 MHz lower than the upper frequency limit of the 6 MHz channel. Consequently, when the video carrier is amplitude modulated with the video signal, the video signal is limited to a bandwidth of about 4.5 MHz as with a vestigial-sideband filter. Nevertheless, as noted above, a standard television receiver will benefit from the greater information in the video signal, and a television receiver adapted to vertically modulate the horizontal scan, in accordance with this invention, will have even greater improvement (40 to 50%) in vertical resolution, albeit band limited, with the use of a heterodyne converter.

It is thus evident that the greatest benefit from the invention will be experienced in those applications that are not band limited. For example, in a video tape recorder, where the recorded program is to be viewed on a monitor, such as in conjunction with motion picture production, the tape recorder and monitor may be equipped with 12 or 14 MHz wideband filters. It is, of course, evident that all general television equipment, including production equipment, used with the invention should be provided with equally broad filters, such as in a vectorscope used to monitor luminance, hue and saturation of color television signals, or an image enhancer. In the latter, each pixel is analyzed vertically and horizontally with respect to surrounding pixels to generate, as a result of the analysis, signals that are added to the pixel being analyzed. This procedure makes the picture look sharper. The enhanced pixels may then be displayed in the usual manner of this invention.

In the production of a television program, a programmed digital computer may be employed to generate video signals in place of a camera, and as in the case of a camera, vertical resolution of the program may be increased by application of the same technique, which is by programming the computer to generate video signals for a modulated horizontal scan rather than a linear scan. Similarly, in the display of a television program, a programmed digital computer may be used to drive a display unit other than a cathode ray tube. Again, application of the technique of the present invention may be utilized to increase vertical resolution, provided only that the display unit is capable of displaying a modulated horizontal display line, such as in a laser display or a flat television display panel, or even a giant display panel having more vertical pixel display capability than the number of lines in the television signal format, which for NTSC television is 525 lines.

Referring once more to the problem of limited bandwidth of broadcast television, because each channel has been allocated 6 MHz in the United States, it is recognized that a solution to the problem is to utilize the present invention with a transmitter broadcasting over two adjacent channels, with authorization from the Federal Communications Commission (FCC). That would be a more convenient solution for cable television since FCC approval would not be required in order to transmit a television program over two or even three adjacent channels. However, it is also recognized that television receivers are designed for single-side band transmission with the sound carrier at 4.5 MHz above the video carrier. Consequently, an expanded bandwidth of 12 MHz over two channels would result in the audio carrier being in the middle of the video side band, and in the case of color television, in the middle of the chrominance subcarrier sideband. As a consequence, it would be necessary to move the audio carrier up another 6 MHz to 10.5 MHz above the video carrier. The audio IF strip of the receiver would therefore require modification in that regard. To that extent, the invention is not compatible with standard (unmodified) receivers. In other words, television programs transmitted with a 12 MHz bandwidth cannot be received by standard receivers. It would be necessary to modify at least the audio IF strip, and to take full advantage of the invention, the bandwidth of the video IF strip should be widened to 12 MHz and the scan lines should be vertically modulated.

Although particular embodiments of the invention have been described and illustrated herein, it is recognized that modifications and variations may readily occur to those skilled in the art. Consequently, it is intended that the claims be interpreted to cover such modifications and variations.

What is claimed is:

1. In a color television system having a chrominance subcarrier of frequency F, said system being comprised of a color camera and display unit, a method for improving vertical resolution of a video signal produced by said camera, frame by frame, comprising the steps of modulating the vertical beam deflection of said camera at a frequency kF while producing said video signal for each line of a frame, where F is said chrominance subcarrier frequency and k is a multiplying factor which assures that the number of cycles of said modulation frequency occurring in each scan line is a whole number so that modulation from line to line is phase synchronized, and said modulation having a frequency sufficient for causing each line scanned to undulate about the normal straight line scan a significant whole number of cycles, and modulating the vertical beam deflection of said display unit with the same phase and relative amplitude as the modulation of said video signal for display of each line of a frame in the same pattern as scanned by said camera using said chrominance subcarrier as a reference for phase synchronizing the modulation of the vertical beam deflection at said display unit.

2. In a method as defined by claim 1, transmitting said video signal to a display unit together with bursts of said chrominance subcarrier during line blanking periods for synchronizing the modulation of said display unit with the same effect of modulation of said camera on said video signal.

3. In a method as defined by claim 2, wherein modulating the vertical beam deflection of said camera at said fixed frequency kF is controlled by the output of a stable chrominance subcarrier oscillator operating at frequency F multiplied by said factor k, and modulating the vertical beam deflection at said display unit at said fixed frequency kF is controlled by the output of a stable oscillator operating at frequency F multiplied by said factor k, said stable oscillator at said display unit being synchronized by said chrominance subcarrier bursts, whereby said information for synchronizing the vertical beam deflection modulation of said display unit is comprised of bursts of cycles from said stable oscillator at said camera gated to said display unit during line blanking periods of said video signal, and said display unit accepts said bursts for synchronizing the phase of said stable oscillator at said display unit.

4. A method as defined in claim 3 wherein said chrominance subcarrier is at 3,579,545 Hz and each frame includes 525 lines divided into two fields of interlaced lines at a rate of 15,734.26374 lines per second, wherein said factor k is equal to two for modulating the vertical beam deflection of each line at both said camera and said display unit.

5. In a television system comprised of a color camera for producing a video signal and a unit for display of said video signal, said camera having a means for vertical and horizontal deflection of an electron beam driven for scanning a predetermined number of horizontal lines for each video frame, and said display unit having means for vertical and horizontal deflection of an electron beam synchronized for displaying said frame, the improvement comprising means for modulating the vertical beam deflection of said camera at a frequency F, where F is a chrominance subcarrier for transmission of video color information, and k is a factor chosen to provide a whole number of vertical deflection modulation cycles in each line scanned, thereby to produce a significant number of cycles of undulation about the normal straight line scan, and means for modulating the vertical beam deflection of said display unit with the same phase and relative amplitude as the modulation of said video signal for display of each line of said frame in the same pattern as scanned by said camera, comprising means at said camera for transmitting bursts of said chrominance subcarrier during horizontal blanking periods of a composite signal transmitted from said camera to said display unit, and at said display unit having a local oscillator synchronized in frequency and phase by said chrominance subcarrier bursts, means for multiplying the output of said local oscillator by said factor k, and means for modulating the vertical deflection signal with said signal multiplied by said factor k.

6. Apparatus as defined in claim 5 wherein each frame includes 525 lines scanned at a line rate of about 15,734 lines per second, and wherein said chrominance frequency is 3,579,545 Hz and said factor K equals 2 whereby each scan line in both said camera and said display unit includes 455 vertical deflection modulation cycles.

7. In a color television system which utilizes a camera having three camera tubes, each with a separate one of red, green and blue filters, a method for improving vertical resolution of a video signal produced by said camera, frame by frame, comprising the steps of effectively modulating the vertical component of said green filtered camera tube while producing said video signal for each line of a frame, said modulation having a frequency sufficient for causing each line scanned to undulate about the normal straight line scan a significant number of cycles with an amplitude sufficient for each cycle of undulation to introduce the scan area of adjacent lines in a frame, and modulating the vertical beam deflection of said receiver with the same phase and relative amplitude as the modulation of said green filtered video signal for display of each line of a frame in the same pattern as produced by said color camera.

8. In a color television system having a chrominance subcarrier of frequency F, said system being comprised of a color camera and display unit, a method for improving vertical resolution of a video signal produced by said camera, frame by frame, comprising the steps of modulating the vertical beam deflection of said camera at a frequency kF while producing said video signal for each line of a frame comprised of 525 lines divided into two fields of interlaced lines at a rate of about 15,734 lines per second, including the step of inverting the phase of said chrominance subcarrier every other line of each field to maintain the modulation phase of each line of a frame constant at both said camera and said display unit, where F is said chrominance subcarrier frequency and k is equal to one, and modulating the vertical beam deflection of said display unit with the same phase and relative amplitude as the modulation of said video signal for display of each line of a frame in the same pattern as scanned by said camera using said chrominance subcarrier as a reference for phase synchronizing the modulation of the vertical beam deflection at said display unit.

* * * * *